United States Patent [19]

Mueller et al.

[11] Patent Number: 5,215,796

[45] Date of Patent: Jun. 1, 1993

[54] MULTILAYER POLYMERIC SHAPED ARTICLE

[75] Inventors: Brett K. Mueller, Savannah; Larry W. Higgins, Adamsville, both of Tenn.

[73] Assignee: Aqua Glass Corporation, Adamsville, Tenn.

[21] Appl. No.: 887,724

[22] Filed: May 22, 1992

[51] Int. Cl.$^5$ ............................................. B32B 3/26
[52] U.S. Cl. ........................ 428/36.5; 264/46.4;
428/218; 428/316.6; 428/318.6; 428/319.3;
428/423.3; 428/423.7
[58] Field of Search ............ 264/46.4; 428/36.5,
428/218, 316.6, 318.6, 319.3, 423.3, 423.7

[56] References Cited

U.S. PATENT DOCUMENTS

| | | |
|---|---|---|
| 3,256,133 | 6/1966 | Wright et al. ............ 428/423.7 |
| 3,487,134 | 12/1969 | Burr ............................ 264/46.6 |
| 3,691,269 | 9/1972 | Robinson et al. .......... 264/255 |
| 3,699,198 | 10/1972 | Robinson ...................... 264/96 |
| 3,703,426 | 11/1972 | Larson et al. ............ 428/423.7 |
| 3,872,199 | 3/1975 | Ottinger ...................... 264/46.4 |
| 4,073,049 | 2/1978 | Lint ............................ 264/46.6 |
| 4,194,940 | 3/1980 | Damico et al. ............ 156/331 |
| 4,244,993 | 1/1981 | Platka, III et al. .......... 428/15 |
| 4,269,885 | 5/1981 | Mahn ............................ 428/216 |
| 4,393,120 | 7/1983 | Watai et al. ................ 428/457 |
| 4,410,595 | 10/1983 | Matsumoto et al. ........ 428/412 |
| 4,568,604 | 2/1986 | Kurtz et al. ................ 428/297 |
| 4,728,564 | 3/1988 | Akagi et al. ................ 428/247 |
| 4,822,549 | 4/1989 | Verwilst ...................... 264/250 |
| 4,868,058 | 9/1989 | Biglione et al. ............ 428/412 |
| 4,889,762 | 12/1989 | Uchiyama et al. .......... 428/195 |
| 4,916,023 | 4/1990 | Kawabata et al. .......... 428/482 |
| 4,933,237 | 6/1990 | Krenceski et al. ........ 428/423.7 |
| 4,956,224 | 9/1990 | Leca ............................ 428/213 |
| 4,959,189 | 9/1990 | Rohrbacher et al. ........ 264/510 |
| 4,960,558 | 10/1990 | Short ............................ 264/510 |
| 5,000,902 | 3/1991 | Adams .......................... 264/510 |
| 5,013,508 | 5/1991 | Troester ........................ 264/224 |
| 5,034,275 | 7/1991 | Pearson et al. .............. 428/336 |
| 5,041,260 | 8/1991 | Johnson et al. .............. 264/510 |
| 5,082,609 | 1/1992 | Rohrlach et al. ............ 264/46.4 |

FOREIGN PATENT DOCUMENTS 863224  3/1961  United Kingdom ............ 428/316.6

Primary Examiner—William J. Van Balen
Attorney, Agent, or Firm—Myron B. Kapustij; Malcolm L. Sutherland

[57] ABSTRACT

A shaped multilayer polymeric article, and a method for manufacturing said article, comprising a top layer comprised of thermoset polyester resin, a supporting layer underneath said top layer comprised of high density polyurethane foam, said supporting layer having a density and thickness at least effective to provide support to said top layer; an intermediate layer underneath at least a portion of said supporting layer comprised of low density polyurethane foam; and a bottom layer underneath at least said intermediate layer comprised of high density polyurethane foam.

62 Claims, 5 Drawing Sheets

MULTILAYER POLYMERIC SHAPED ARTICLE

FIELD OF THE INVENTION

This invention relates to composite resinous shaped articles such as a bathtubs, bathtub and shower enclosures, basins, shower enclosures, and the like.

BACKGROUND OF THE INVENTION

Composite shaped articles such as bathtubs, bathtub and shower enclosures, shower stalls, basins, and the like comprised of synthetic resinous materials are known and have become increasingly popular due, inter alia, to their light weight, ease of installation, and easy maintenance. One such type of resinous shaped article is comprised of a relatively thin gel top coat comprised of thermoset polyester, a supporting layer underneath said top coat comprised of a chopped glass fiber filled or reinforced thermoset polyester, an intermediate layer underneath said supporting layer comprised of polyurethane foam containing no reinforcing fibers, and a bottom layer underneath said intermediate layer comprised of chopped glass fiber reinforced thermoset polyester.

While such resinous composite shaped articles are very useful and satisfactory, they suffer from one drawback. This drawback is present in the manufacturing process used to produce said article. This composite article is made by first depositing the gel top coat layer on the outer surface of a mold, then depositing the supporting layer onto the gel coat layer, followed by depositing the intermediate layer on the supporting layer, and finally depositing the bottom layer on the intermediate layer. Since the gel top coat layer is quite thin and thus susceptible to puncture, deformation, and other damage, the supporting layer must be free of voids, air-pockets, and the like. However, the fiber glass filled thermosettable polyester supporting layer, as deposited by spraying, generally is not sufficiently free of such voids, airpockets, and the like. These imperfections must be removed from the polyester resin before the thermosettable polyester resin is cured or thermoset. This may be accomplished by passing a roller over the glass filled thermosettable polyester deposit to remove any voids, airholes, and the like present therein. However, this is a rather time consuming and labor intensive procedure, particularly if the composite article is of a complex shape or form.

Furthermore, it would be advantageous if such a composite article were provided which exhibited a similar strength and rigidity while being lighter in weight.

The present invention provides a composite article wherein the rolling step in the preparation of the supporting layer is eliminated, and provides a composite article having substantially similar strength an rigidity but being lighter in weight.

SUMMARY OF THE INVENTION

The present invention relates to resinous shaped articles such as bathtubs, bathtub and shower enclosures, shower stalls and surrounds, basins, and the like. The shaped article is comprised of a plurality of layers comprised of resinous materials, preferably thermoset resinous materials, including a relatively thin top layer comprised of thermoset polyester; at least one supporting layer beneath said top layer comprised of polyurethane foam having a relatively high density; an intermediate layer beneath at least a portion of said supporting layer in surface-to-surface contact with said supporting layer comprised of a polyurethane foam; and at least one bottom layer comprised of a polyurethane foam beneath said intermediate layer and in surface-to-surface contact with said intermediate layer and, where said intermediate layer is absent, beneath and in surface-to-surface contact with said supporting layer. The polyurethane foam of the intermediate layer has a lower density than the polyurethane foam of the supporting layer. The polyurethane foam of the bottom layer preferably has a higher density than the polyurethane foam of the intermediate layer.

DETAILED DESCRIPTION OF THE PREFERRED EMBODIMENT

Figure 1:
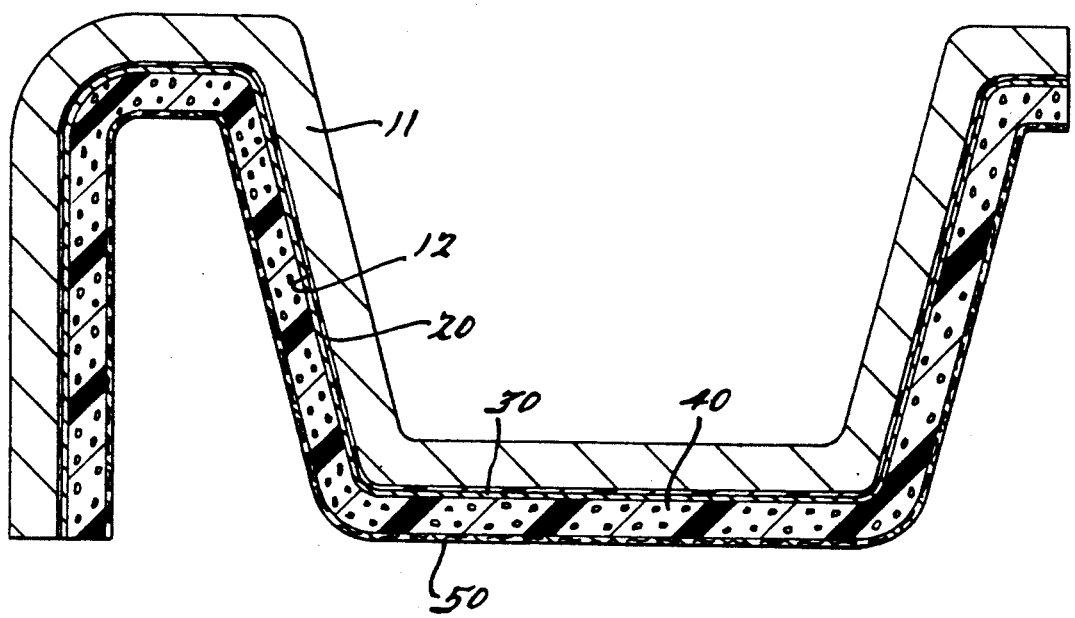
FIG. 1 is a cross-sectional view of one embodiment of a shaped article of the instant invention, in this instance a bathtub, on a mold showing both the mold and the various resin layers.

FIG. 1 illustrates one embodiment of the shaped article, e.g., bathtub, on the mold after all the various resinous layers have been applied and cured and just prior to its removal from mold 11. The mold 11 has an exterior surface 12 which is configured to a pre-determined, desired shape. A thin coating comprised of thermosettable polyester resin is applied onto surface 12 of mold 11. After this thermosettable polyester resin is cured or thermoset to form top layer 20 comprised of a thermoset polyester resin, a coating comprised of thermosettable polyurethane foam having a density, in its cured state, of at least about 10 lbs/cu. ft. is applied onto layer 20. After this coating comprised of thermosettable polyurethane foam is cured or thermoset to form supporting layer 30 comprised of thermoset polyurethane foam, a second intermediate coating of thermosettable polyurethane foam is applied onto layer 30. This intermediate coating is allowed to foam and cure or thermoset to form intermediate layer 40 comprised of thermoset polyurethane foam. The thermoset polyurethane foam of layer 40 preferably has a lower density than the polyurethane foam of layer 30. After this intermediate polyurethane foam layer 40 is formed, a bottom coating of thermosettable polyurethane foam is applied onto layer 40 and cured or thermoset to form bottom layer 50. The thermoset polyurethane foam comprising layer 50 preferably has a higher density than the polyurethane foam of layer 40.

Figure 2:
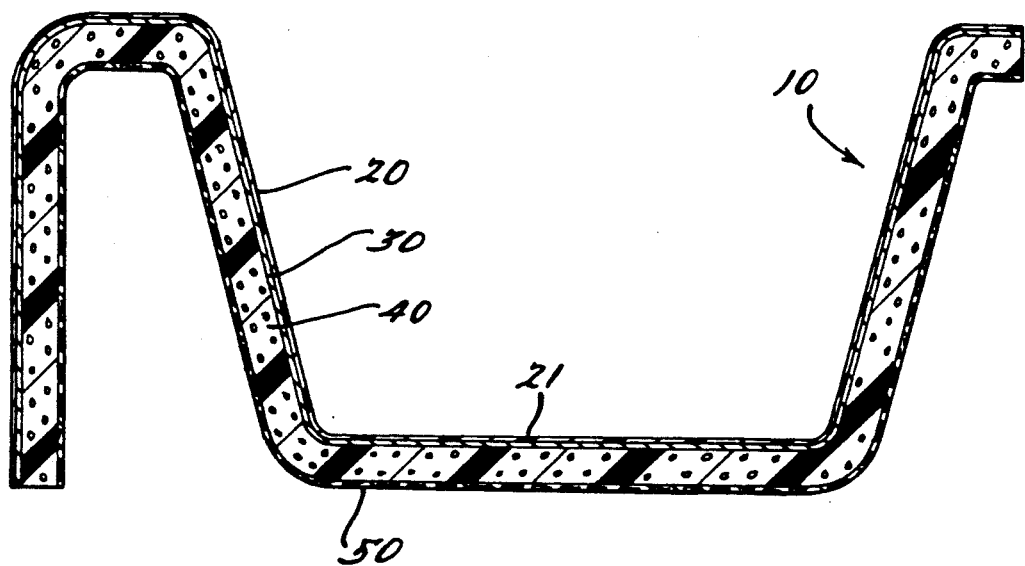
FIG. 2 is a cross-sectional view of the shaped article of FIG. 1 after it has been removed from the mold showing the various resin layers comprising the shaped article.

After the bottom layer 50 is formed, the shaped article is removed from the mold and may be subjected to further processing such as trimming and the like. The shaped article 10 after removal from the mold 11 is illustrated in FIG. 2.

The mold 11 may be of any type well know in the art. Mold 11 may also contain various well known mold release agents such as waxes and the like on surface 12 in order to facilitate removal of the article 10 from the mold.

Layers 20, 30, 40 and 50 do not contain fiber reinforcing materials such as for example glass fibers.

The polyurethane foam of supporting layer 30 has a relatively high density in order to provide support and backing for the relatively thin gel coat top layer 20. If the density of the polyurethane foam of layer 30 is too low, not enough support will be provided by layer 30 to layer 20, and consequently layer 20 may be relatively easily punctured or deformed.

Gel coat top layer 20 is quite thin and is comprised of thermoset polyester resin. Thermoset polyester resins are well known to those skilled in the art. The thermoset polyester resins may generally be formed by condensation reaction of anhydrides such as maleic anhydride or carboxylic acids such as maleic acid with alcohols; generally anhydrides or dicarboxylic acids with polyols such as ethylene glycol and the like, and including optionally an aromatic unsaturated polycarboxylic acid or anhydride such as phthalic acid or anhydride, isophthalic acid or anhydride, terephthalic acid or anhydride, orthophthalic acid or anhydride and the like. The bond resulting from the condensation reaction is an ester bond. Generally the mixture is dissolved in an unsaturated monomer such as styrene, the unsaturated polyesters usually being cross-linked through their double bonds in the presence of a suitable unsaturated monomer such as styrene. In the presence of catalysts, and generally of heat, the resins will cure to form a hard thermoset.

Polyester resins are formed from a variety of materials including maleic acid or anhydride, fumaric acid, phthalic acid or anhydride, isophthalic acid or anhydride, and the like with alcohols such as ethylene glycol, propylene glycol, diethylene glycol and dipropylene glycol. The most common cross-linking agents are styrene and diallyl phthalate.

Peroxide catalysts such as benzoyl peroxide, methyl ethyl ketone peroxide, tertiary butyl perbenzoate and cumene hydroperoxide are usually added to the polyester resin to effect curing. A number of other peroxide catalysts such a cyclohexanone peroxide, 2,4-dichlorobenzoyl peroxide, bis-(para-bromobenzoyl) peroxide, and acetyl peroxide, are also used.

Polymerization inhibitors may be added to polyester resins to prevent polymerization of the polyester resin at room temperature in the absence of catalysts. Some typically used inhibitors include hydroquinone, paratertiary-butyl-catechol, phenolic resins, aromatic amines, pyrogallol, chloranil, picric acid and quinones.

General literature references relevant to polyester resins which may be used in preparing resin compositions in accordance with the invention are the Condensed Chemical Dictionary (10th Ed.), G. D. Hawley (Reviser), Van Nostrand Reinhold (NY), 1981, p 830; Encyclopaedia of Polymer Science and Technology, H. F. Mark, N. G. Gaylord, and N. M. Bikales (Eds.), John Wiley and Sons, NY, 1969, Vol. 11, p 62–168, U.S. Pat. No. 3,396,067; and U.S. Pat. No. 2,255,313, the disclosures thereof being incorporated herein by reference.

The thermosettable polyester resin composition may also optionally contain a solvent so that it may readily be sprayed on the mold 11. Any of the nonreactive solvents normally in making polyester resin compositions suitable for spraying may be used. Representative examples of these include benzene, toluene, the paraffinic naphthas, the naphthenic naphthas, the aromatic naphthas, ethyl formate, propyl formate, butyl formate, amyl formate, ethyl acetate, propyl acetate, methyl acetate, butyl acetate, amyl acetate, acetone methyl ethyl ketone, diethyl ketone, methyl isoamyl ketone, cellosolve acetate, cellosolve propylate, cellosolve acetate butyrate, dioxane, lower nitroparaffins, etc. Mixtures of solvents may be used.

Generally, sufficient solvent is added to form a solution containing from about 40 to about 65 percent solids. However, a higher or lower concentration of solids can be used.

This thermosettable polyester composition may also optionally include pigments, flame retardants, surfactants, inert fillers such as talc, mica, etc., mold release agents, and other well known processing fillers which give a composition that can be sprayed as a heavy even coat without sagging, pinholing, eyeholing or other processing defects.

The thermosettable polyester resin composition does not contain any fibrous reinforcing material such as glass fibers. Thus, the gel coat top layer 20 is likewise free of reinforcing fibers.

The coating of thermosettable polyester composition is deposited, preferably by spraying, onto the surface 12 of mold 11. The thickness of the thermosettable composition coating deposited onto the surface 12 of mold 11 is generally a thickness which upon thermosetting of said polyester provides a thermoset polyester layer having a thickness of from about 10 to about 30 mils. Generally, this coating thickness is from about 12 to about 34 mils. The thermosettable polyester is then cured or thermoset. This is generally accomplished by heating at about 80° to about 110° F. for a period of from about 15 to about 30 minutes. It is to be understood that curing time may be decreased by increasing the curing temperature.

The gel coat top layer 20 preferably has a smooth and shiny outer surface 21 simulating the appearance of porcelain. This is accomplished by the surface 12 of the mold upon which the thermosettable polyester resin composition is sprayed being smooth and polished.

The gel coat top layer 20 generally has a thickness of from about 10 to about 30 mils, preferably from about 14 to about 20 mils.

Supporting layer 30 is comprised of high density thermoset polyurethane foam. The polyurethane foams are well known in the art and are described, inter alia, in "Encyclopedia of Chemical Technology", Kirt-Othmer, Second Edition, Volume 21, pages 84–94, Interscience publishers, a division of John Wiley and Sons, Inc., New York, N.Y., incorporated herein by reference.

Polyurethanes may generally be prepared by reacting an organic polyisocyanate with an active hydrogen-containing compound such as a polyol or a polyamine.

By the term "polyurethane" is meant a polymer whose structure contains predominately urethane

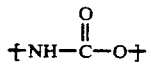

linkages between repeating units. Such linkages are formed by the addition reaction between an organic isocyanate group R—[—NCO] and an organic hydroxyl group [HO—]—R. In order to form a polymer, the organic isocyanate and hydroxyl group-containing compounds must be at least difunctional. However, as modernly understood, the term "polyurethane" is not limited to those polymers containing only urethane linkages, but includes polymers containing allophanate, biuret, carbodiimide, oxazolinyl, isocyanurate, uretidinedione, and urea linkages in addition to urethane. The reactions of isocyanates which lead to these types of linkages are summarized in the *Polyurethane Handbook*, Gunter Vertel, Ed., Hanser Publishers, Minich, 001985, in Chapter 2, pages 7–41; and in *Polyurethanes: Chemistry and Technology*, J. H. Saunders and K. C. Frisch, Interscience Publishers, New York, 1963, Chapter III, pages 63–118. In addition to polyols (polyhydroxyl-containing monomers), the most common isocyanate-reactive monomers are amines and alkanolamines. In these cases, reaction of the amino group leads to urea linkages interspersed within the polyurethane structure.

The urethane forming reaction is generally catalyzed. Catalysts useful are well know to those skilled in the art, and many examples may be found for example, in the *Polyurethane Handbook*, Chapter 3, §3.4.1 on pages 90–95; and in *Polyurethanes: Chemistry and Technology* in Chapter IV, pages 129–217. Most commonly utilized catalysts are tertiary amines and organotin compounds, particularly dibutyltin diacetate and dibutyltin dilaurate. Combinations of catalysts are often useful also.

In the preparation of polyurethanes, the isocyanate is reacted with the active hydrogen-containing compound(s) in an isocyanate to active hydrogen ratio of from 0.5 to 1 to 10 to 1. The "index" of the composition is defined as the —NCO/active hydrogen ratio multiplied by 100. While the extremely large range described previously may be utilized, most polyurethane processes have indices of from 90 to about 120 or 130, and more preferably from 95 to about 110. In the case of polyurethanes which also contain significant quantities of isocyanurate groups, indices of greater than 200 and preferably greater than 300 may be used in conjunction with a trimerization catalyst in addition to the usual polyurethane catalysts. In calculating the quantity of active hydrogens present, in general all active hydrogen containing compounds other than non-dissolving solids are taken into account. Thus the total is inclusive of polyols, chain extenders, functional plasticizers, etc.

Hydroxyl group-containing compounds (polyols) useful in the preparation of polyurethanes are described in the *Polyurethane Handbook* in chapter 3, §3.1 pages 42–61; and in *Polyurethanes; Chemistry and Technology* in Chapter II, §§III and IV, pages 32–47. Many hydroxyl-group containing compounds may be used, including simple aliphatic glycols, dihydroxy aromatics, bisphenols, and hydroxyl-terminated polyethers, polyesters, and polyacetals, among others. Extensive lists of suitable polyols may be found in the above references and in many patents, for example in columns 2 and 3 of U.S. Pat. No. 3,652,639; columns 2–6 of U.S. Pat. No. 4,421,872; and columns 4–6 of U.S. Pat. No. 4,310,632; those three patents being hereby incorporated by reference.

Preferably used are hydroxyl-terminated polyoxyalkylene and polyester polyols. The former are generally prepared by well known methods, for example by the base catalyzed addition of an alkylene oxide, preferably ethylene oxide (oxirane), propylene oxide (methyloxirane) or butylene oxide (ethyloxirane) to an initiator molecule containing on the average two or more active hydrogens. Examples of preferred initiator molecules are dihydric initiators such as ethylene glycol, propylene glycol, butylene glycol, neopentyl glycol, 1,6-hexanediol, hydroquinone, recorcinol, the disphenols, aniline and other aromatic monoamines, aliphatic monoamines, and monoesters of glycerine; trihydric initiators such as glycerine, trimethylolpropane, trimethylolethane, N-alkylphenylenediamines, mono-, di-, and trialkanolamines; tetrahydric initiators such as ethylene diamine, propylenediamine, 2,4'-, 2,2'-, and 4,4'- methylenedianiline, toluenediamine, and pentaerythritol; pentahydric initiators such as diethylenetriamine; and hexahydric and octahydric initiators such as sorbitol and sucrose.

Addition of alkylene oxide to the initiator molecules may take place simultaneously or sequentially when more than one alkylene oxide is used resulting in block, heteric and block-heteric polyoxyalkylene polyethers. The number of hydroxyl groups will generally equal the number of active hydrogens in the initiator molecule. Processes for preparing such polyethers are described both in the *Polyurethane Handbook* and *Polyurethanes; Chemistry and Technology* as well as in many patents, for example U.S. Pat. Nos. 1,922,451; 2,674,619; 1,922,459; 3,190,927; and 3,346,557.

Polyester polyols also represent preferred poly-urethane-forming reactants. Such polyesters are well known in the art and are prepared simply by polymerizing polycarboxylic acids or their derivatives, for example their acid chlorides or anydrides, with a polyol. Numerous polycarboxylic acids are suitable, for example malonic acid, citric acid, succinic acid, glutaric acid, adipic acid, pimelic acid, azelaic acid, sebacic acid, maleic acid, fumaric acid, terephthalic acid, and phthalic acid. Numerous polyols are suitable, for example the various aliphatic glycols, trimethylolpropane and trimethyloethane, a-methylglucoside, and sorbitol. Also suitable are low molecular weight polyoxyalkylene glycols such as polyoxyethylene glycol, polyoxypropylene glycol, and block and heteric polyoxyethylene-polyoxypropyene glycols. These lists of dicarboxylic acids and polyols are illustrative only, and not limiting. An excess of polyol should be used to ensure hydroxyl termination, although carboxy groups are also reactive with isocyanates. Methods of preparation of such polyester polyols are given in the *Polyurethane Handbook* and in *Polyurethanes; Chemistry and Technology*.

Also suitable as the polyol are polymer modified polyols, in particular the so-called graft polyols. Graft polyols are well known to the art, and are prepared by the in situ polymerization of one or more vinyl monomers, preferably acrylonitrile and styrene, in the presence of a polyether or polyester polyol, particularly polyols containing a minor amount of natural or induced unsaturation. Methods of preparing such graft polyols may be found in columns 1-5 and in the Examples of U.S. Pat. No. 3,652,639; in columns 1-6 and the Examples of U.S. Pat. No. 3,823,201; particularly in columns 2-8 and the Examples of U.S. Pat. No. 4,690,956; and in U.S Pat. No. 4,524,157; all of which patents are herein incorporated by reference.

Non-graft polymer modified polyols are also preferred, for example those prepared by the reaction of a polyisocyanate with an alkanolamine in the presence of a polyol as taught by U.S. Pat. Nos. 4,293,470; 4,296,213; and 4,374,209; dispersions of polyisocyanurates containing pendant urea groups as taught by U.S. Pat. No. 4,386,167; and polyisocyanurate dispersions also containing biuret linkages as taught by U.S. Pat. No. 4,359,541. Other polymer modified polyols may be prepared by the in situ size reduction of polymers until the particle size is less than 20)m, preferably less than 10)m.

Also useful in preparing polyurethanes are monomers containing other functional groups which are reactive with isocyanates. Examples of these are preferably the amines, for example the substituted and unsubstituted toluenediamines and methylenedianilines; the alkanolamines; the amino-terminated polyoxylalkylene polyethers; and sulfhydryl terminated polymers, to name but a few. The alkanolamines and amines, particularly diamines, are particularly useful, as the aminogroup reacts faster than the hydroxyl group and thus these molecules can act as isocyanate chain extenders in situ without the need to prepare prepolymers. Examples of hindered, alkyl substituted aromatic diamines which are particularly useful are disclosed in U.S. Pat. No. 4,218,543.

Many isocyanates are useful in the preparation of urethanes. Examples of such isocyanates may be found in columns 8 and 9 of U.S. Pat. No. 4,690,956, herein incorporated by reference. The isocyanates preferred are the commercial isocyanates toluenediisocyanate (TDI) methylenediphenylene-diisocyanate (MDI), and crude or polymeric MDI. Other isocyanates which may be useful include isophoronediisocyanate and tetramethylxylylidenediisocyanate. Other isocyanates may be found in the *Polyurethane Handbook*, Chapter 3, §3.2 pages 62-73 and *Polyurethanes: Chemistry and Technology* Chapter II, §II, pages 17-31.

Modified isocyanates are also useful. Such isocyanates are generally prepared through the reaction of a commercial isocyanate, for example TDI or MDI, with a low molecular weight diol or amine, or alkanolamine, or by the reaction of the isocyanates with themselves. In the former case, isocyanates containing urethane, biuret, or urea linkages are prepared, while in the latter case isocyanates containing allophanate, carbodiimide, or isocyanurate linkages are formed.

Chain extenders may also be useful in the preparation of polyurethanes. Chain extenders are generally considered to be low molecular weight polyfunctional compounds or oligomers reactive with the isocyanate group. Aliphatic glycol chain extenders commonly used include ethylene glycol, propylene glycol, 1,4-butanediol, and 1,6-hexanediol. Amine chain extenders include aliphatic monoamines but especially diamines such as ethylenediamine and in particular the aromatic diamines such as the toluenediamines and the alkylsubstituted (hindered) toluenediamines.

Other additives and auxiliaries are commonly used in polyurethanes. These additives include plasticizers, flow control agents, fillers, antioxidants, flame retardants, pigments, dyes, mold release agents, and the like. Many such additives and auxiliary materials are discussed in the *Polyurethane Handbook* in Chapter 3, §3.4, pages 90-109; and in *Polyurethanes: Chemistry and Technology*, Part II, Technology.

Polyurethane foams contain an amount of blowing agent which is inversely proportional to the desired foam density. Blowing agents may be physical (inert) or reactive (chemical) blowing agents. Physical blowing agents are well known to those in the art and include a variety of saturated and unsaturated hydrocarbons having relatively low molecular weights and boiling points. Examples are butane, isobutane, pentane, isopentane, hexane, and heptane. Generally the boiling point is chosen such that the heat of the polyurethane-forming reaction will promote volatilization.

The most commonly used physical blowing agents, however, are currently the halocarbons, particularly the chlorofluorocarbons. Examples are methyl chloride, methylene chloride, trichlorofluoromethane, dichlorodifluoromethane, chlorotrifluoromethane, chlorodifluoromethane, the chlorinated and fluorinated ethanes, and the like. Brominated hydrocarbons may also be useful. Blowing agents are listed in the *Polyurethane Handbook* on page 101.

Chemical blowing agents are generally low molecular weight species which react with isocyanates to generate carbon dioxide. Water is one practical chemical blowing agent, producing carbon dioxide in a one-to-one mole ratio based on water added to the foam formulation. Unfortunately, completely water-blown foams have not proven successful in many applications, and thus it is common to use water in conjunction with a physical blowing agent.

Blowing agents which are solids or liquids which decompose to produce gaseous by-products at elevated temperatures can in theory be useful, but have not achieved commercial success. Air, nitrogen, argon, and carbon dioxide under pressure can also be used in theory, but have not proven commercially viable. Research in such areas continues, particularly in view of the trend away from chlorofluorocarbons.

Polyurethane foams generally require a surfactant to promote uniform cell sizes and prevent foam collapse. Such surfactants are well known to those skilled in the art, and are generally polysiloxanes or polyoxyalkylene polysiolxanes. Such surfactants are described, for example, in the *Polyurethane Handbook* on pages 98-101. Commercial surfactants for these purposes are available from a number of sources, for example from Wacker Chemie, the Union Carbide corporation, and the Dow-Corning Corporation.

Processes for the preparation of polyurethane foams and the equipment used therefore are well known to those in the art, and are described, for example, in the *Polyurethane Handbook* in Chapter 4, pages 117-160 and in *Polyurethane; Chemistry and Technology*, Part II, Technology, in Chapter VII, §§III and IV on pages 7-116 and Chapter VIII, §§III and IV on pages 201-238.

Polyurethane useful in this invention may be prepared by reacting a reactive hydrogen-containing material such as a polyol or a reactive hydrogen-containing polymeric material with a polyisocyanate according to the following general procedure which is known as the prepolymer method: The reactive hydrogen-containing material such as a polymeric material is reacted with the organic polyisocyanate in proportions such that the ratio of isocyanate groups to the reactive hydrogen-containing groups of the reactive hydrogen-containing material such as a polymeric material is from about 1.1/1 to about 12/1 and preferably about 1.2/1 to about 2.5/1. These materials are generally reacted at temperatures from about 20° C. to about 150° C. The reactive hydrogens of the reactive hydrogen-containing material such as a polymeric material are supplied by hydroxyl groups and amine groups. When the reactive hydrogen-containing material is a polymeric material this prepolymer is then usually dissolved or dispersed in the solvent to form a solution or dispersion which is then mixed with a catalyst, chain extending agent, and/or a cross-linking agent to form a polyurethane reaction mixture.

Other methods known to those skilled in the art of preparing polyurethane reaction mixtures with or without solvents being present may also be used.

As mentioned supra agents which promote chain extension and cross-linking of the polymer are also useful and are sometimes known as curing agents which facilitate reacting the polyurethane reaction mixture. Aromatic diamines, hydrocarbon diols, such as ethylene glycol and propylene glycol, hydroxyl-amines such as triisopropanolamine, are used in this invention as such agents. When these agents are used they are usually added to the prepolymer in a ratio of from about 0.5/1 to about 1.5/1 and, preferably, about 0.8/1 to about 1.0/1 amine and or hydroxyl groups of the chain extending and cross-linking agent for each isocyanate group in excess of the reactive hydrogen groups of the reactive hydrogen-containing polymeric material. Bifunctional materials such as glycols and diamines are generally preferred as chain extending and cross-linking agents. In general the bifunctional materials yield products having superior spraying properties. Representative classes of compounds suitable for use as such agents are glycols, diamines having primary or secondary amino groups, dicarboxylic acids, hydroxy amines, hydroxy-carboxylic acids, and amino-carboxylic acids. Representative examples of suitable compounds belonging to these classes are glycols such as ethylene glycol, 1,3-propane-diol, 1,4-butane-diol and glycerol; aliphatic diamines such as ethylene diamine, trimethylene diamine, and tetramethylene diamine; aromatic diamines such as m-phenylene diamine, o- and m-dichlorobenzidine, 2,5-dichlorophenylene diamine, 3,3'-dichloro-4,4'-diamino-diphenyl methane, dianisidine, 4,4'-diamino-diphenyl methane, the naphthylene diamines, toluene-2,4-diamine, p-aminobenzyl aniline, and o- and p-aminodiphenyl-amine; hydroxy amines such as triethanol amine, 2-amino-ethyl alcohol, 2-amino-1-naphthol and m-aminophenyl; hydroxy carboxylic acids such as glycolic acid and alpha-hydroxy propionic acid; and amino carboxylic acids such as amino acetic acid and amino benzoic acid. The preferred crosslinking agents are butane diol and the chloroamines such as orthodichlorobenizine and methylene bis-orthochloroaniline. Generally the chain extending or cross-linking agents having acid groups tend to from a cellular polyurethane.

In one embodiment a solvent may be used to prepare the polyurethane reaction mixture. Any of the nonreactive solvents normally used in preparing compositions suitable for spraying are useful for the polyurethane reaction mixtures which may be used in this invention. Representative examples of these are benzene, toluene, the paraffinic naphthas, the naphthenic naphthas, the aromatic naphthas, ethyl formate, propyl formate, butyl formate, amyl formate, ethyl acetate, propyl acetate, methyl acetate, butyl acetate, amyl acetate, acetone methyl ethyl ketone, diethyl ketone, methyl isoamyl ketone, cellosolve acetate, cellosolve propylate, cellosolve acetate bytyrate, dioxane, lower nitroparaffins, etc. Mixtures of solvents may be used.

Generally, sufficient solvent is added to form a solution containing from about 40 to about 65 percent solids. However a higher or lower concentration of solids can be used.

In a preferred embodiment of the instant invention the isocyanate component is mixed with the polyol component in the spray gun before spraying. In this embodiment the isocyanate component is stored in one container or drum. The second container or drum contains the polyol component, the catalyst, the blowing agent, and other optionally present materials such as surfactant, flame retardants, chain extenders, and the like. The contents of the two containers are mixed just before application to form a reaction mixture, and this reaction mixture is then applied or used to form the polyurethane.

It is critical that the high density thermoset polyurethane foam comprising layer 30 has a density and thickness at least effective to provide support to said top layer 20. Thus, the high density thermoset polyurethane foam has a density of at least about 10 lbs/ft$^3$, preferably at least about 15 lbs/ft$^3$, and more preferably at least about 20 lbs/ft$^3$. The upper range of density is not critical and is governed by factors such as the design of the spraying equipment and economics. Generally, the density should not exceed about 70 lbs/ft$^3$, preferably it should not exceed about 50 lbs/ft$^3$, and more preferably it should not exceed about 35 lbs/cu. ft. The minimum thickness of layer 30 is at least about 30 mils thick, preferably at least about 60 mils thick. Layer 30 is from about 30 mils to about 400 mils thick, preferably from about 60 mils to about 250 mils thick. If the density is less than about 10 lbs/cu. ft. and layer 30 is thinner than about 30 mils, layer 30 will not provide sufficient support to layer 20.

The thermosettable, foamable polyurethane composition which when thermoset and foamed comprises supporting layer 30 is deposited onto layer 20 as a coating having a thickness effective to provide a thermoset, foamed polyurethane layer having a thickness of at least about 30 mils. Since, upon foaming, the thermosettable, foamable polyurethane expands to about twice its thickness, this coating thickness is at least about 15 mils. This coating of thermosettable, foamable, polyurethane composition is preferably deposited onto layer 20 by spraying.

The thermosettable, foamable polyurethane coating is then allowed to foam and cure or thermoset. This generally requires from about 20 to about 40 minutes. Since this reaction is exothermic, the application of heat is not required to form the thermoset, high density polyurethane foam comprising supporting layer 30.

Intermediate layer 40 is comprised of a thermoset polyurethane foam. The thermoset polyurethane foam of layer 40 preferably has a lower density than the thermoset polyurethane foam of layer 30 and is a low density polyurethane foam. Generally the density of the thermoset polyurethane foam comprising layer 40 may range from about 1.25 lbs/ft$^3$ to about 15 lbs/ft$^3$, preferably from about 1.5 lbs/ft³ to about 10 lbs/ft³, more preferably from about 1.5 lbs/ft³ to about 3 lbs/ft³.

Layer 40 is formed by depositing a coating comprised of thermosettable, foamable polyurethane composition onto layer 30. This coating composition is then allowed to thermoset and foam to provide a thermoset polyurethane foam comprising layer 40. The preferred method of depositing this coating composition onto layer 30 is by spraying.

The thickness of the thermosettable, foamable polyurethane coating deposited on layer 30 is an amount which is effective to provide a thermoset polyurethane foam layer 40 having a thickness of from about 250 mils to about 1,500 mils. Since this is a low density system, i.e., a highly foamable system, the coating of thermosettable, foamable polyurethane composition required to produce the required thickness of the thermoset polyurethane foam layer 40 is relatively thin, e.g., from about 20 to about 100 mils.

The polyurethane foam coating is sprayed onto layer 30 after the polyurethane foam comprising layer 30 has foamed and cured or thermoset. The thermosettable, foamable polyurethane composition is then allowed to foam and cure or thermoset thus forming layer 40. The curing generally takes from about 20 to about 40 minutes.

Layer 40 is generally thicker than layer 30. Layer 40 generally has a thickness of from about 250 mils to about 1,500 mils, preferably from about 500 mils to about 800 mils.

After the thermosettable, foamable polyurethane has foamed and cured or thermoset to form the thermoset polyurethane foam layer 40 a coating comprised of thermosettable, foamable polyurethane composition is deposited onto layer 40.

This thermosettable foamable polyurethane composition coating is generally similar to or the same as the thermosettable foamable polyurethane composition used to produce supporting layer 30, and is generally applied in the same or similar manner as the composition used to form layer 30. This thermosettable, foamable polyurethane composition is allowed to foam and cure or thermoset thereby forming bottom layer 50.

The thermoset polyurethane foam comprising bottom layer 50 generally has a density of from about 10 lbs/ft³ to about 70 lbs/ft³, preferably from about 15 to about 50 lbs/ft³, and more preferably from about 20 to about 35 lbs/ft³.

Layer 50 is generally from about 30 mils to about 400 mils thick, preferably from about 40 mils to about 200 mils thick.

After layer 50 is formed the shaped article is removed from the mold 11 and may be subjected to further processing such as trimming and the like.

The instant invention also includes a method of manufacturing a composite shaped article. In one embodiment, as illustrated in FIGS. 1 and 2, the method comprises applying a thermosettable polyester resin composition coating onto surface 12 of mold 11; heating this composition coating at an elevated temperature and for a period of time effective to substantially or completely thermoset said thermosettable polyester resin thereby forming top layer 20; applying a coating comprised of foamable, thermosettable polyurethane composition free of any reinforcing fibrous material such as glass fibers onto layer 20; allowing the foamable, thermosettable polyurethane composition coating to cure thereby forming supporting layer 30; applying a coating comprised of thermosettable foamable polyurethane composition free of any reinforcing fibrous material such as glass fibers onto said supporting layer 30; allowing this thermosettable, foamable polyurethane composition to foam and cure or thermoset thereby forming intermediate layer 40; applying a coating comprised of thermosettable, foamable polyurethane composition free of any reinforcing fibrous material such as glass fibers onto said intermediate layer 40; allowing the thermosettable, foamable polyurethane composition to foam and cure or thermoset to thereby form bottom layer 50; and removing the composite article from the mold.

Figure 3:
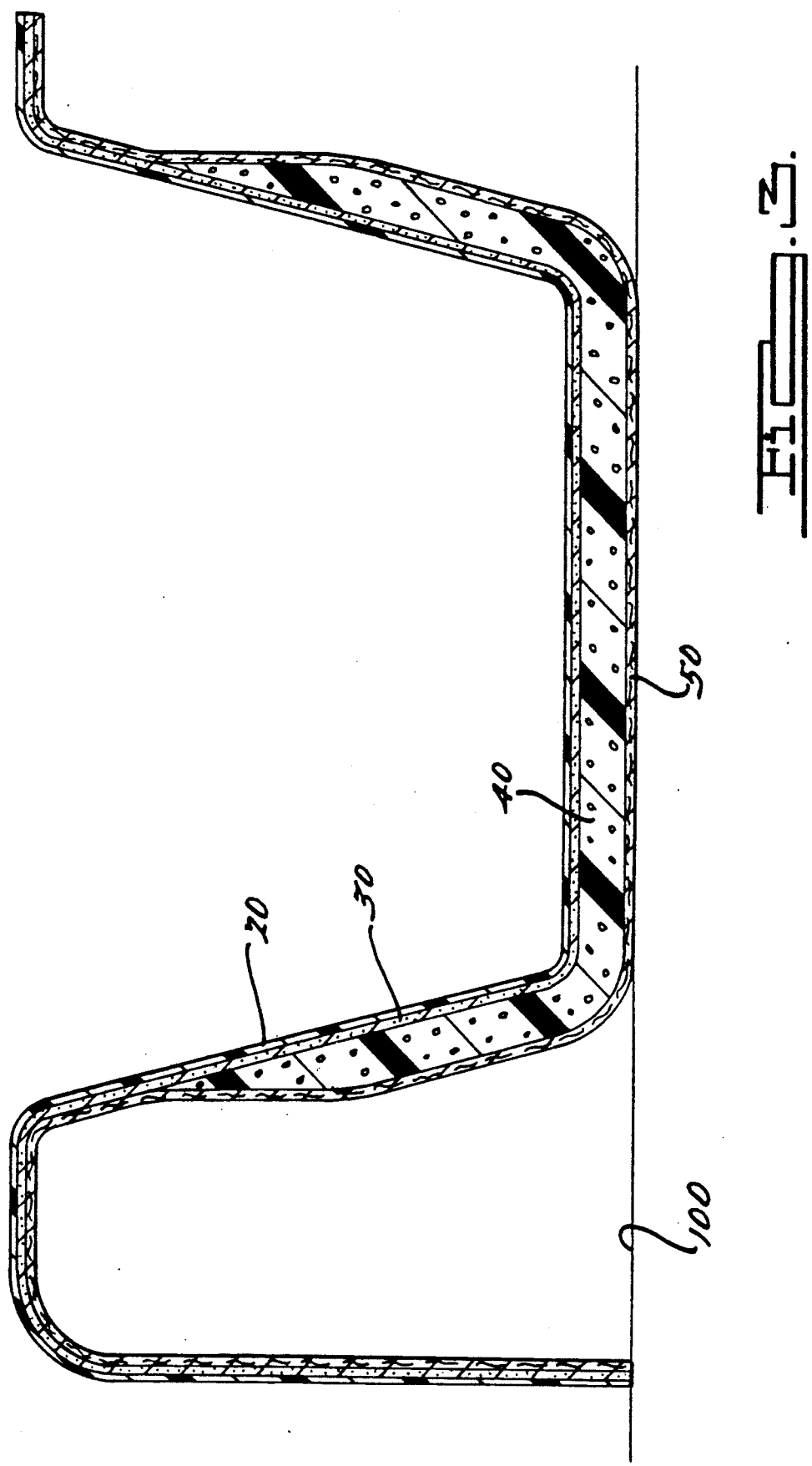
FIG. 3 is a cross-sectional view of another embodiment of a shaped article, in this instance a bathtub, after it has been removed from the mold showing the various resin layers comprising the shaped article. In this embodiment the intermediate polyurethane layer is disposed on only a portion of the supporting layer.

In the embodiment illustrated in FIG. 3 the intermediate thermoset polyurethane foam layer 40 is disposed on only a portion of supporting layer 30. It is disposed mainly at those areas which are subjected to the greatest stress and load forces, e.g., at the sides and bottom of the tub. Where layer 40 is absent bottom layer 50 is disposed directly on and in surface-to-surface contact with supporting layer 30.

This structure is prepared substantially in accordance with the procedure described for the embodiment illustrated in FIGS. 1 and 2 with the exception that the thermosettable, foamable polyurethane composition forming layer 40 is applied, preferably sprayed, on only a portion of the supporting layer 30. This intermediate coating composition is allowed to foam and cure to a thermoset and foamed state to form intermediate layer 40. Bottom layer 50 is then disposed on intermediate layer 40 in those areas where intermediate layer 40 is present, and directly onto supporting layer 30 in those areas where intermediate layer 40 is not present.

Figure 4:
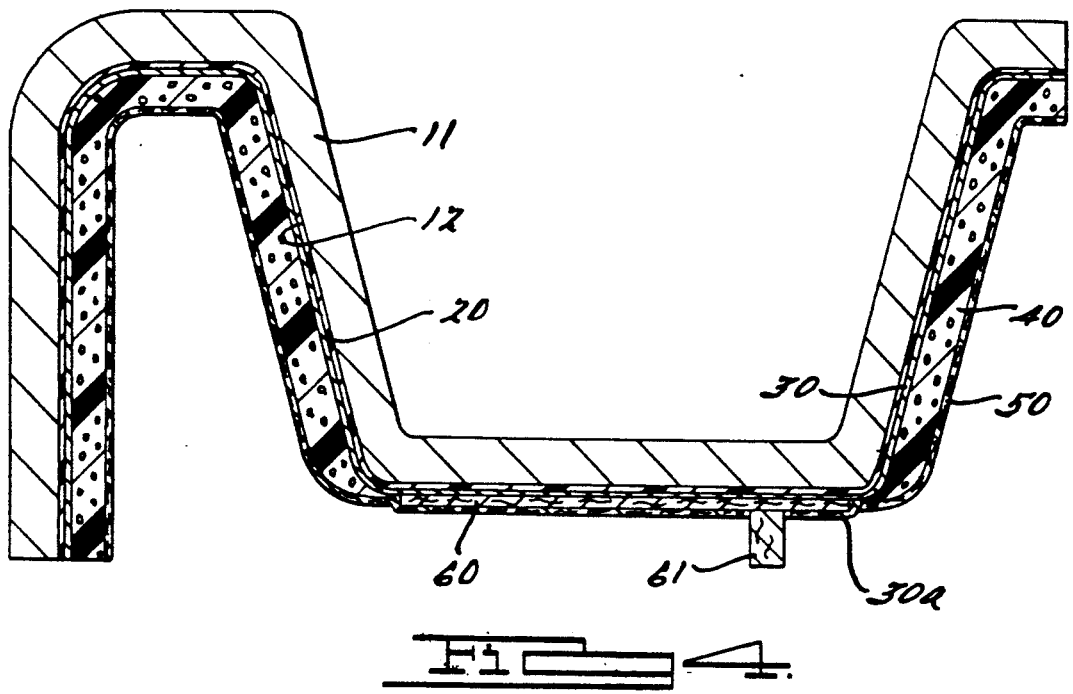
FIG. 4 is a cross-sectional view of yet another embodiment of a shaped article, in this instance a bathtub, on a mold showing both the mold and the various resin layers as well as the wood supports.
Figure 5:
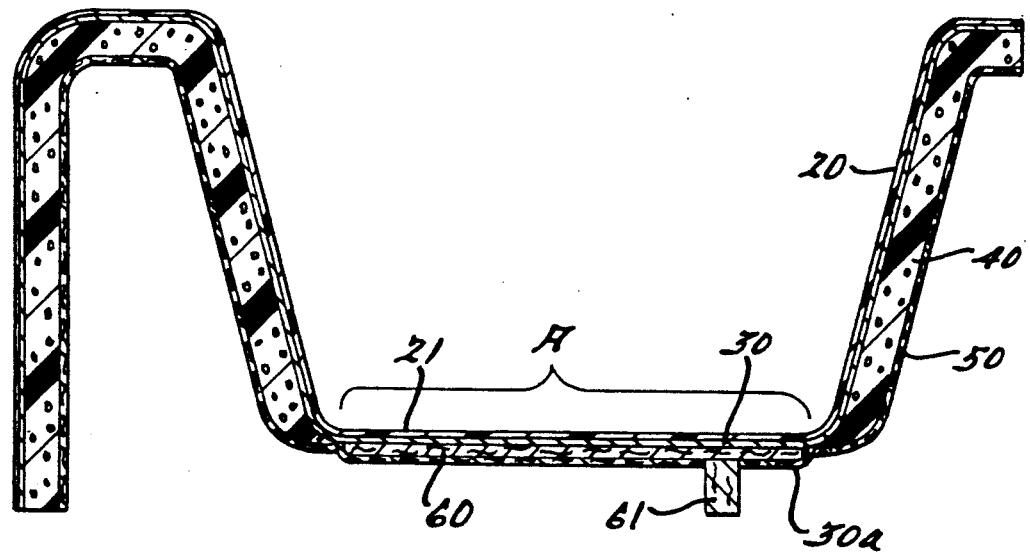
FIG. 5 is a cross-sectional view of the bathtub of FIG. 4 after it has been removed from the mold.
Figure 6:
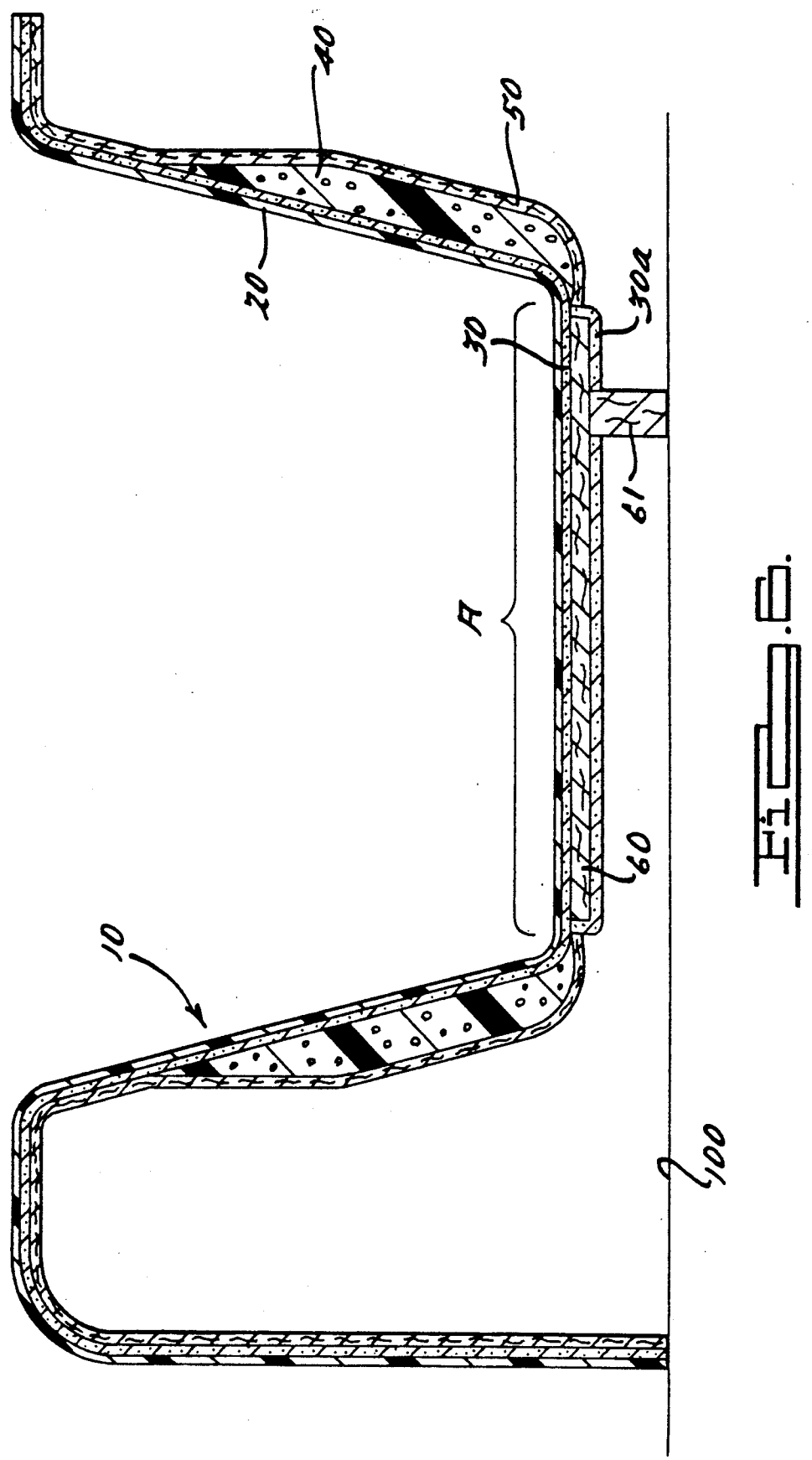
FIG. 6 is a cross-sectional view of still another embodiment of a shaped article, in this instance a bathtub, after it has been removed from the mold showing the various resin layers comprising the shaped article and the wooden supports. In this embodiment the intermediate polyurethane layer is disposed on only a portion of the supporting layer.

In the embodiments illustrated in FIGS. 4–6 the shaped structure, in this case a bathtub, is provided with a support structure comprised of members 60 and 61 on the bottom wall 14 at area A. Member 60 is a flat, horizontally extending member comprised of fiberboard, plywood, and the like. Member 61 is generally a 2" by 4" piece of wood attached, by fasteners such as nails, to member 60. As illustrated in FIG. 6 the bottom of the tub does not rest directly on floor 100 but is supported by the support structure.

In making the shaped articles of the embodiments illustrated in FIGS. 4–6 the thermoset polyester top layer 20 is first formed on the surface 12 of mold 11 as described above. A coating comprised of thermosettable, foamable polyurethane composition is then deposited on layer 20 and cured or thermoset to form layer 30 having a thickness and density as described supra. This composition is deposited and cured to form layer 30 as described above except at the bottom wall 14 of the tub at area A where the support member is disposed.

Over area A the thickness of this coating composition which is deposited on layer 20 is less than that required to provide, upon curing or thermosetting and foaming, layer 30 having a thickness of at least about 30 mils. Generally, the thickness of this coating at A is sufficient to form a thermoset polyurethane foam layer, herein referred to as layer 30', having a thickness of at least about one half of the total thickness of the cured layer 30, i.e., at least about 15 mils, generally from at least about 15 mils to about 200 mils depending upon the thickness of the cured layer 30. The coating composition is then allowed to cure or thermoset to form layer 30' comprised of a thermoset polyurethane foam which has a thickness of at least about 15 mils, preferably at least about 30 mils. Layer 30' generally has a thickness from at least about 15 mils to about 200 mils. Once layer 30' is formed a second coating of this foamable, thermosettable polyurethane composition is deposited on layer 30'. The thickness of this second coating is sufficient to form a second layer, hereinafter referred to as layer 30", comprised of a thermoset polyurethane foam which, when combined with the thickness of layer 30', will produce layer 30 having the thickness described supra. Generally, layer 30" will have a thickness of from at least about 15 mils to about 200 mils. Before this second coating composition is cured to form layer 30" the supporting member 60 is pressed against this uncured composition.

Since this uncured composition is quite tacky, it acts as an adhesive to adhere member 60 to cured layer 30'. Once the supporting member 60 is in place and adheres to layer 30' on the bottom wall 14 at area A of the tub, more of this thermosettable, foamable polyurethane composition is deposited onto the surface of support member 60 and around the edges of the support member 60. Generally sufficient composition is deposited on and around member 60 to form a cured layer 30a having a thickness of from about 30 to about 400 mils. The coating composition deposited on layer 30' and on and around member 60 are then allowed to cure or thermoset to form layers 30" and 30a, respectively. Supporting member 60 is thus laminated or bonded to the shaped article 10, more specifically to layer 30'.

As can be seen from the foregoing layers 30', 30" and 30a are all comprised of the same or substantially the same thermoset polyurethane foam. Furthermore, layers 30' and 30" form layer 30 at area A which has a thickness of at least about 30 mils. Layer 30 outside area A is formed in a one step process. Layer 30 in area A is formed by a two step process which includes first forming layer 30' and then forming layer 30" on layer 30'. Layer 30 outside area A is identical in composition to layer 30 in area A. Both layers 30 in area A and outside area A have a minimum thickness of at least about 30 mils.

In the embodiment illustrated in FIGS. 4 and 5 the intermediate layer 40 and bottom layer 50 are then deposited onto supporting layer 30 as described above. As seen in FIGS. 4 and 5 layers 40 and 50 do not extend over layer 30a.

The embodiment illustrated in FIG. 6 is similar to the embodiment illustrated in FIG. 3 in that intermediate layer 40 is deposited only over a portion of supporting layer 30, with the portions of layer 30 which do not have layer 40 deposited therein being in contact with bottom layer 50.

The tub structure illustrated in FIGS. 2, 3, 5, 6 and 7 is comprised of side walls 13 and a bottom wall 14. In the embodiment illustrated in FIG. 2 the intermediate layer 40 is present in both the side walls 13 and the bottom wall 14. In the embodiment illustrated in FIG. 3 the intermediate layer 40 is present in only part of the side walls 13 and in the bottom wall 14. In those areas of the side walls where intermediate layer 40 is absent bottom layer 50 is disposed directly on supporting layer 30.

Figure 7:
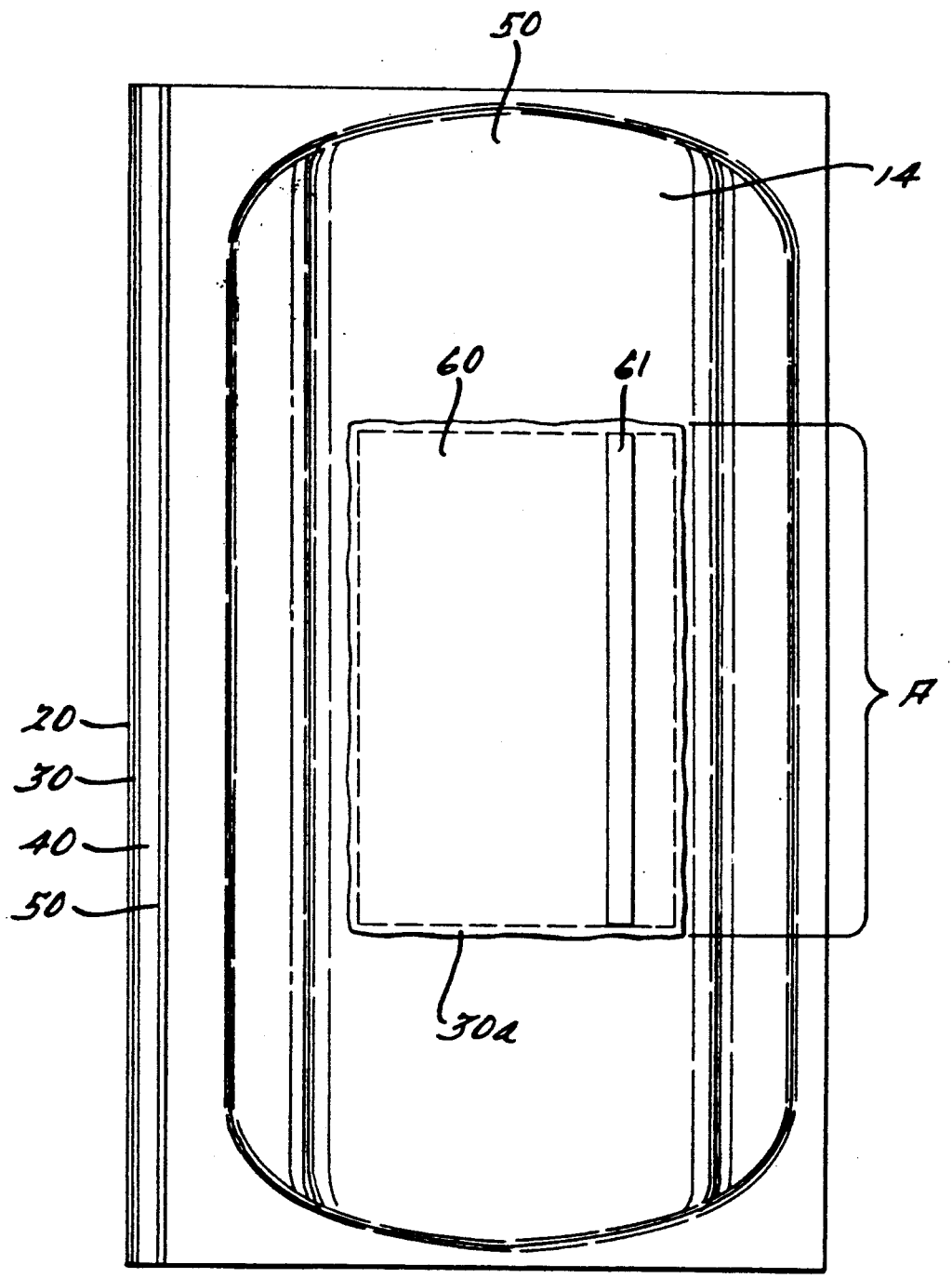
FIG. 7 is a bottom plan view in partial section of the bathtub of FIG. 5 showing the support structure on the bottom wall, with the laminating layer disposed over and around the edges of the support structure.

In the embodiment illustrated in FIGS. 5, 6 and 7 the supporting structure 60 and 61 does not extend along the entire length of the bottom wall 14 of the tub. The supporting structure, as illustrated in FIG. 7, is generally located in approximately the center section of the bottom wall. In these areas of the bottom wall 14 where the supporting structure is not present bottom layer 50 is disposed directly on the bottom surface or side of supporting layer 30, e.g., intermediate layer 40 is not present in the bottom wall 14.

In the embodiment illustrated in FIG. 5 the intermediate layer 40 is disposed on supporting layer 30 in the side walls 13, while in the bottom wall 14 intermediate layer 40 is absent and the bottom layer 50 is disposed directly on the bottom surface or side of supporting layer 30 in those portions of the bottom wall not covered by the supporting structure 60 and 61.

In the embodiment illustrated in FIG. 6 the intermediate layer is present in only a portion of the side walls 13. In those portions of the side walls 13 where intermediate layer 40 is absent the bottom layer 50 is disposed directly on supporting layer 30. The intermediate layer 40 is absent from the bottom wall 14 and in bottom wall 14 bottom layer 50 is disposed directly on supporting layer 50 in those portions of bottom wall 14 not covered by the supporting structure 60 and 61.

In both the embodiments illustrated in FIG. 5 and 6, as best illustrated in FIG. 7, bottom layer 50 is not present on supporting structure 60 and 61. Instead, member 60 of the supporting structure has layer 30a disposed thereover. The following examples are presented to further illustrate the present invention. They are presented by way of illustration rather than limitation.

EXAMPLE 1

This example illustrates the preparation of a bathtub illustrated in FIG. 2. There is provided a bathtub shaped mold 11 having substantially the shape illustrated in FIG. 1. A first coating comprising thermosettable unsaturated polyester composition is sprayed onto the exterior surface 12 of the mold. The thermosettable polyester composition comprises the following components in percent by weight:

21.17% of a dicyclopentadiene polyester resin (derived from diethylene glycol and maleic acid) in styrene monomer;
38.39% of a neopentyl glycol orthopthalic polyester resin in styrene monomer;
13.62% styrene monomer;
8.86% talc filler;
0.04% lecithin
3.54% zeothix
10.63% titanium dioxide
2.84% Zeolex 80 (alumina silicate)
0.36% silicone
0.13% vegetable oil
0.18% of a 12% cobalt catalyst
0.17% dimethylacetoamine This composition is mixed with a stream of 2 weight percent of methyl ethyl ketone peroxide catalyst as it exits the nozzle of the spray gun, and this resultant composition containing 2 weight percent methyl ethyl ketone peroxide is sprayed onto the mold. The first coating thickness is about 20 mils. This coating is cured and the thermosettable polyester resin thermoset at about 40 degree Centigrade for a period of about 20 minutes to form top layer 20. Top layer 20 is about 15 mils thick.

After top layer 20 is formed a second coating comprised of high density, thermosettable, foamable polyurethane composition is sprayed onto layer 20. The polyurethane composition components are stored in two separate tanks and are mixed in about a 50/50 weight % basis in a spray gun, and the resultant reaction mixture is then ejected from the nozzle of the spray gun. One tank contains polymethylenepolyphenylene polyisocyanate commercially available from BASF Corporation under the designation LUPRANATE TM M20S. The other tank contains less than about 85 weight % polyol (comprised of a mixture of a monoethanolamine-initiated polyoxypropylene-polyoxyethylene copolymer having a nominal equivalent weight of 112; a toluene diamine/ethylenediamine-initiated polyoxyethylene-polyoxypropylene copolymer having a nominal equivalent weight of 187; and a polyethylene terephthalate-based aromatic polyester polyol having a nominal equivalent weight of 160); about 5 weight glycerine; about 1% water blowing agent, about 2 weight % silicone surfactant; about 2 weight % dimethylcyclohexylamine; and less than about 10 weight % trichloropropyl phosphate flame retardant. The resultant reaction mixture coating composition is deposited on the surface of layer 20. The thickness of this coating is about 50 mils. The polyurethane composition is then allowed to cure or thermoset at about 35° Centigrade for about 20 minutes to form supporting layer 30. Supporting layer 30 has a thickness of about 125 mils. The thermoset, high density polyurethane foam comprising supporting layer 30 has a density of about 25 pounds per cubic foot.

After supporting layer 30 is formed a third coating is sprayed onto supporting layer 30. This third coating is comprised of low density thermosettable, foamable polyurethane composition. The polyurethane composition components are stored in two separate tanks and are mixed on about a 50/50 weight % basis in a spray gun, and the resultant reaction mixture is then ejected from the nozzle of the spray gun and sprayed onto supporting layer 30. One tank contains polymethylenepolyphenylene polyisocyanate commercially available from BASF Corporation under the designation LUPRANATE TM M20S. The other tank contains about 60 weight percent polyol (comprised of a mixture of a monoethanolamine-initiated polyoxypropylene-polyoxyethylene copolymer having a nominal equivalent weight of 112; a toluene diamine/ethylenediamine-initiated polyoxyethylene-polyoxypropylene copolymer having a nominal equivalent weight of 187; and a polyethylene terephthalate-based aromatic polyester polyol having a nominal equivalent weight of 160); about 10 weight percent silicone; about 4 weight percent dimethylcycolhexane; and about 25 weight % trichlorofluoromethane blowing agent. This reaction mixture coating composition is deposited on the surface of supporting layer 30. The thickness of this coating is about 100 mils. The polyurethane composition is then allowed to cure or thermoset at about 25° Centigrade for about 2 minutes to form intermediate layer 40. The low density thermoset polyurethane foam comprising intermediate layer 40 has a density of about 2 pounds per cubic foot. Intermediate layer 40 is about 750 mils thick.

After intermediate layer 40 is formed a fourth coating is sprayed onto intermediate layer 40. This fourth coating is comprised of high density, thermosettable, foamable polyurethane composition. This fourth coating is the same as the second coating described above. The thickness of this fourth coating is about 30 mils. The polyurethane composition is allowed to cure at about 35 degree Centigrade for about 20 minutes to form bottom layer 50. Bottom layer 50 is the same as supporting layer 30, e.g., the thermoset high density polyurethane foam has a density of about 25 pounds per cubic foot. Bottom layer 50 is about 75 mils thick.

Once layer 50 is formed the article is removed from the mold and subjected to finishing operations such as trimming, etc.

EXAMPLE 2

This example illustrates the preparation of a bathtub illustrated in FIG. 3. The procedure of Example 1 is substantially repeated with the exception that the third coating of Example 1 is sprayed only on a portion of supporting layer 30 on side walls 13. The top portions of side walls 13, as illustrated in FIG. 3, are left free of the third coating. The third coating is allowed to cure as set forth in Example 1 to form intermediate layer 40.

The fourth coating of Example 1 is then sprayed onto intermediate layer 10 where present and onto supporting layer 30 where intermediate layer 40 is absent. The fourth coating is then allowed to cure as set forth in Example 1 to form bottom layer 50.

The article is then removed from the mold. The article produced by this example is illustrated in FIG. 3.

EXAMPLE 3

This Example illustrates the preparation of a bathtub illustrated in FIG. 5.

There is provided a bathtub shaped mold 11. The first coating of Example 1 is sprayed onto the exterior surface 12 of the mold 11. The first coating has a thickness of about 20 mils. This coating is cured at about 40° Centigrade for a period of about 20 minutes to form top layer 20. Top layer 20 is about 15 mils thick and is comprised of thermoset polyester resin.

After top layer 20 is formed, a second coating of Example 1 comprised of the high density, thermosettable, foamable polyurethane composition is sprayed onto layer 20. However, this second coating is sprayed onto layer 20 in two different thicknesses. The thickness of the second coating on area A on bottom wall 14 is less than the thickness of the coating on the side walls 13 and on the bottom wall 14 outside area A. The thickness of the second coating on area A is about 25 mils. The thickness of the second coating on the side walls 13 and on the bottom wall 14 outside area A is about 50 mils. The high density, thermosettable, foamable polyurethane composition comprising the second coating is allowed to cure at about 35° Centigrade for a period of about 20 minutes to form the supporting layer 30 comprised of thermoset, high density polyurethane foam as described in Example 1. In area A the supporting layer 30 has a thickness of about 63 mils, while on the side walls 13 and on bottom wall 14 outside area A the supporting layer 30 has a thickness of about 125 mils.

After this supporting layer 30 is formed more of this second coating composition (hereinafter referred to as the third coating) is sprayed onto area A to form a coating having a thickness of about 25 mils (this third coating thickness is sufficient to provide a cured layer having a thickness of about 63 mils). Thus, the supporting layer 30 on area A will have a thickness substantially equal or equal to the thickness of the supporting layer on the side walls 13 and on the bottom wall 14 outside area A, i.e., about 125 mils). Before this third coating composition on area A is cured, e.g., while it is still tacky, the support structure comprised of fiberboard with a 2" by 4" board attached thereto is pressed against the third coating in area A.

More of this second coating composition (hereinafter referred to as the fourth coating) is then sprayed onto the surface and around the edges of the support structure. The thickness of this fourth coating is about 50 mils. The third and fourth coatings are then allowed to cure thereby laminating the support structure to the article. The cured third coating forms part of the supporting layer 30, while the cured fourth coating forms laminating layer 30a. Laminating layer 30a has a thickness of about 125 mils. The composition of the laminating layer 30a is the same as the composition of the supporting layer 30.

A fifth coating comprised of thermosettable, low density, foamable polyurethane composition (which is the same as the third coating composition in Example 1) is sprayed onto the supporting layer 30 on only the side walls 13. The fifth coating thickness is about 100 mils. The fifth coating is allowed to cure at about 35° Centigrade for about 2 minutes to form intermediate layer 40. Intermediate layer 40 has the same composition as intermediate layer 40 in Example 1. The thickness of intermediate layer 40 is about 750 mils.

After intermediate layer 40 is formed a sixth coating comprised of thermosettable, high density, foamable polyurethane composition (which is the same as the fourth coating composition of Example 1) is sprayed onto the intermediate layer 40 on the side walls 13. This sixth coating has a thickness of about 30 mils. This sixth coating is allowed to cure at about 35° Centigrade for a period of about 20 minutes to form bottom layer 50. Bottom layer 50 has a thickness of about 75 mils and is of the same composition as bottom layer 50 of Example 1.

The second, third, fourth and sixth coatings are generally comprised of the same thermosettable, high density, foamable polyurethane composition, i.e., the second coating composition of Example 1.

The outside is then removed from the mold and subjected to additional processing such as trimming, cutting and the like.

EXAMPLE 4

This Example illustrates the preparation of a bathtub illustrated in FIG. 6.

The procedure of Example 3 is substantially repeated except that the fifth coating is sprayed only on a portion of supporting layer 30 on side walls 13. The top portions of side walls 13, as illustrated in FIG. 6, are left free of the fifth coating. The fifth coating is allowed to cure as in Example 3 to form intermediate layer 40.

The sixth coating of Example 3 is then sprayed onto intermediate layer 40 where present and onto supporting layer 30 on the side walls 13 where intermediate layer 40 is absent. The sixth coating is allowed to cure as in Example 3 to form bottom layer 50. As seen in FIG. 6, bottom layer 50 is present on intermediate layer 40 where intermediate layer 40 is present and on supporting layer 30 on those portions of side walls 13 where intermediate layer 40 is absent.

We claim:

1. A multilayer polymeric article comprising:
   top layer having a top side and a bottom side comprised of thermoset polyester;
   supporting layer having a top side and bottom side comprised of thermoset high density polyurethane foam disposed on said bottom side of said top layer;
   intermediate layer having a top side and a bottom side comprised of thermoset low density polyurethane foam disposed on said bottom side of at least a portion of said supporting layer; and
   bottom layer comprised of thermoset high density polyurethane foam disposed at least on said bottom side of said intermediate layer.

2. The multilayer polymeric article of claim 1 wherein said supporting layer has a thickness and density at least effective to provide support to said top layer.

3. The multilayer polymeric article of claim 2 wherein said thermoset high density polyurethane foam comprising said supporting layer has a density of at least about 10 pounds per cubic foot.

4. The multilayer polymeric article of claim 3 wherein said thermoset high density polyurethane foam has a density of at least about 15 pounds per cubic foot.

5. The multilayer polymeric article of claim 4 wherein said thermoset high density polyurethane foam has a density of at least about 20 pounds per cubic foot.

6. The multilayer polymeric article of claim 2 wherein said supporting layer is at least about 30 mils thick.

7. The multilayer polymeric article of claim 6 wherein said supporting layer is at least about 60 mils thick.

8. The multilayer polymeric article of claim 3 wherein said supporting layer is at least about 30 mils thick.

9. The multilayer polymeric article of claim 8 wherein said supporting layer is at least about 60 mils thick.

10. The multilayer polymeric article of claim 4 wherein said supporting layer is at least about 30 mils thick.

11. The multilayer polymeric article of claim 10 wherein said supporting layer is at least about 60 mils thick.

12. The multilayer polymeric article of claim 5 wherein said supporting layer is at least about 30 mils thick.

13. The multilayer polymeric article of claim 12 wherein said supporting layer is at least about 60 mils thick.

14. The multilayer polymeric article of claim 2 wherein said thermoset polyurethane foam comprising said intermediate layer has a density of from about 1.25 pounds per cubic foot to about 15 pounds per cubic foot.

15. The multilayer polymeric article of claim 14 wherein said intermediate layer is thicker than said supporting layer.

16. The multilayer polymeric article of claim 15 wherein said intermediate layer has a thickness of from about 250 mils to about 1,500 mils.

17. The multilayer polymeric article of claim 14 wherein the density of said thermoset high density polyurethane foam comprising said bottom layer is from about 10 to about 70 pounds per cubic foot.

18. The multilayer polymeric article of claim 17 wherein said bottom layer is from about 30 mils to about 400 mils thick.

19. The multilayer polymeric article of claim wherein said intermediate layer is disposed on said bottom side of said supporting layer and said bottom layer is disposed on said bottom side of said intermediate layer.

20. The multilayer polymeric article of claim wherein said intermediate layer is disposed on said bottom side of only a portion of said supporting layer, and said bottom layer is disposed on said bottom side of said intermediate layer and on said bottom side of said supporting layer on that portion of said supporting layer where said intermediate layer is absent.

21. A process for making a multilayer polymeric article comprising:
providing a mold;
spraying a first coating comprising a thermosettable polyester resin composition on the exterior of said mold, and curing said thermosettable polyester resin so as to form a top layer comprised of thermoset polyester resin;
spraying a second coating comprising a thermosettable, high density, foamable polyurethane composition on the exterior of said top layer, and permitting said second coating to cure so as to form a supporting layer comprising thermoset high density polyurethane foam;
spraying a third coating comprising a thermosettable, low density, foamable polyurethane composition on the exterior of at least a portion of said supporting layer, and permitting said third coating to cure so as to form an intermediate layer comprising thermoset, low density, polyurethane foam on at least a portion of said supporting layer;
spraying a fourth coating comprising a thermosettable, high density, foamable polyurethane composition on the exterior of at least said intermediate layer, and permitting said foruth coating to cure so as to form a bottom layer on at least said intermediate layer comprising thermoset, high density polyurethane foam.

22. The process of claim 21 which includes removing said article from said mold after said bottom layer is formed.

23. The process of claim 21 wherein said thermoset, high density polyurethane foam comprising said supporting layer has a density of at least about 10 pounds per cubic foot.

24. The process of claim 23 wherein said thermoset, high density polyurethane foam comprising said supporting layer has a density of at least about 15 pounds per cubic foot.

25. The process of claim 24 wherein said thermoset, high density polyurethane foam comprising said supporting layer has a density of at least about 20 pounds per cubic foot.

26. The process of claim 24 wherein said thermoset, low density polyurethane foam comprising said intermediate layer has a density of from about 1.25 to about 15 pounds per cubic foot.

27. The process of claim 26 wherein said thermoset, high density polyurethane foam comprising said bottom layer has a density of from about 10 to about 70 pounds per cubic foot.

28. The process of claim 21 wherein said third coating is sprayed on the exterior of only a portion of said supporting layer and is permitted to cure so as to form said intermediate layer on the exterior of only a portion of said supporting layer, and wherein said fourth coating is sprayed on the exterior of said intermediate layer where said intermediate layer is present and on the exterior of that portion of said supporting layer where said intermediate layer is absent and is allowed to cure so as to form said bottom layer on the exterior of said intermediate layer and on that portion of the exterior of said supporting layer where said intermediate layer is absent.

29. The process of claim 21 wherein said third coating is sprayed on the exterior of said supporting layer and is permitted to cure so as to form said intermediate layer on the exterior of said supporting layer, and wherein said fourth coating is sprayed on the exterior of said supporting layer and is permitted to cure so as to form said bottom layer on the exterior of said intermediate layer.

30. A multilayer polymeric article comprising of side walls and a bottom wall comprising:
layer having a top side and a bottom side comprising thermoset polyester resin;
supporting layer having a top side and a bottom side comprising thermoset, high density polyurethane foam disposed on said bottom side of said top layer;
support means having a top side and a bottom side comprised of cellulosic material disposed on said bottom side of said supporting layer on a portion of said bottom wall;
laminating layer comprised of thermoset, high density polyurethane foam disposed over said bottom side of said support means and around the edges of said support means whereby laminating said support means to said supporting layer;
intermediate layer having a top side and a bottom side comprised of thermoset, low density polyurethane foam disposed on said bottom side of said supporting layer on at least a portion of said side walls; and
bottom layer comprised of thermoset, high density polyurethane foam disposed on said bottom side of said intermediate layer and on the bottom side of said supporting layer where said intermediate layer is absent.

31. The multilayer polymeric article of claim 30 wherein said intermediate layer is disposed on said bottom side of said supporting layer on all or substantially all of said side walls.

32. The multilayer polymeric article of claim 31 wherein said bottom layer is disposed on the bottom side of said intermediate layer on said side walls and on the bottom side of said supporting layer on said bottom wall.

33. The multilayer polymeric article of claim 30 wherein said intermediate layer is disposed on said bottom side of said supporting layer on only a portion of said side walls.

34. The multilayer polymeric article of claim 33 wherein said bottom layer is disposed on said bottom side of said intermediate layer on said side walls where said intermediate layer is present, on the bottom side of said supporting layer in those portions of said side walls where said intermediate layer is absent, and on the bottom side of said supporting layer on said bottom wall.

35. The multilayer polymeric article of claim 30 wherein said supporting layer has a density and thickness at least effective to provide support to said top layer.

36. The multilayer polymeric article of claim 35 wherein said density is at least about 10 pounds per cubic foot.

37. The multilayer polymeric article of claim 36 wherein said thickness is at least about 30 mils.

38. The multilayer polymeric article of claim 37 wherein said density is at least about 15 pounds per cubic foot.

39. The multilayer polymeric article of claim 38 wherein said density is at least about 20 pounds per cubic foot.

40. The multilayer polymeric article of claim 36 wherein said thermoset, low density polyurethane foam comprising said intermediate layer has a lower density than said thermoset, high density polyurethane foam comprising said supporting layer.

41. The multilayer polymeric article of claim 40 wherein said thermoset, low density polyurethane foam comprising said intermediate layer has a density of from about 1.25 pounds to about 15 pounds per cubic foot.

42. The multilayer polymeric article of claim 41 wherein said intermediate layer is thicker than said supporting layer.

43. The multilayer polymeric article of claim 42 wherein said intermediate layer has a thickness of from about 250 mils to about 1,500 mils.

44. The multilayer polymeric article of claim 40 wherein said thermoset, high density polyurethane foam comprising said bottom layer has a higher density than said thermoset, low density polyurethane foam comprising said intermediate layer.

45. The multilayer polymeric article of claim 44 wherein said thermoset, high density polyurethane foam comprising said bottom layer has a density of from about 10 to about 70 pounds per cubic foot.

46. The multilayer polymeric article of claim 45 wherein said bottom layer has a thickness of from about 30 to about 400 mils.

47. The multilayer polymeric article of claim 40 wherein said thermoset, high density polyurethane foam comprising said laminating layer has a density of from about 10 to about 70 pounds per cubic foot.

48. A process for making a multilayer polymeric article having bottom wall and side walls comprising:
providing a mold having side walls and bottom wall;
spraying a first coating comprising a thermosettable polyester resin composition on the exterior of said side walls and bottom wall of said mold, and curing said thermosettable polyester resin to form a top layer comprised of thermoset polyester resin;
spraying a second coating comprising thermosettable, high density, foamable polyurethane composition on the exterior of said top layer, with the proviso that the thickness of said second coating sprayed on said first layer on a portion of said bottom wall is less than the thickness of said second coating sprayed on said first layer on the remaining portion of said bottom wall and said side walls, and allowing said second coating to cure to form a supporting layer comprised of thermoset, high density polyurethane foam, said supporting layer being thinner at a portion of said bottom wall than at the remaining portion of said bottom wall and said side walls;
spraying a third coating comprised of thermosettable, high density, foamable polyurethane composition onto said thinner portion of said supporting layer;
placing a support means in contact with said third coating on said thinner portion of said supporting layer before said third coating has cured;
spraying a fourth coating comprising thermosettable, high density, foamable polyurethane composition over said support means and around the edges of said support means, and allowing said third coating and said fourth coating to cure with said third coating forming part of said support layer and said fourth coating forming a laminating layer comprised of thermoset, high density polyurethane foam laminating said support means to said supporting layer;
spraying a fifth coating comprised of thermosettable, low density foamable polyurethane composition onto said supporting layer on at least a portion of said side walls, and allowing said fifth coating to cure to form an intermediate layer comprised of thermoset, low density polyurethane foam; and
spraying a sixth coating comprised of thermosettable, high density, foamable polyurethane composition onto at least said intermediate layer, and allowing said sixth coating to cure to form a bottom layer comprised of thermoset, high density polyurethane foam.

49. The process of claim 48 which includes removing said article from said mold after said bottom layer is formed.

50. The process of claim 48 wherein said second coating, said third coating and said fourth coating are comprised of the same or substantially the same thermosettable, high density, foamable polyurethane composition.

51. The process of claim 48 wherein said second coating and said third coating are comprised of the same or substantially the same thermosettable, high density, foamable polyurethane composition.

52. The process of claim 51 wherein the amount of said third coating sprayed onto said thinner portion of said supporting layer is effective to provide a supporting layer having the same or substantially the same thickness as said supporting layer on said side walls and remaining portion of said bottom wall.

53. The process of claim 48 wherein said fifth coating is sprayed on at least said supporting layer on said side walls, and
wherein said fifth coating is allowed to cure to form said intermediate layer on at least said supporting layer on said side wall.

54. The process of claim 53 wherein said fifth coating is sprayed onto said intermediate layer where said intermediate layer is present and onto said supporting layer where said intermediate layer is absent.

55. The process of claim 48 wheein said thermoset, high density polyurethane foam comprising said supporting layer has a density and thickness at least effective to provide support to said top layer.

56. The process of claim 55 wherein said thermoset, high density polyurethane foam comprising said supporting layer has a density of at least about 10 pounds per cubic foot.

57. The process of claim 56 wherein said supporting layer is at least about 30 mils thick.

58. The process of claim 55 wherein the thermoset, low density polyurethane foam comprising said intermediate layer has a lower density than said thermoset, high density polyurethane foam comprising said supporting layer.

59. The process of claim 58 wherein said thermoset, low density polyurethane foam comprising said intermediate layer has a density of from about 1.5 to about 10 pounds per cubic foot.

60. The process of claim 59 wherein said intermediate layer has a thickness of from about 250 to about 1,500 mils.

61. The process of claim 60 wherein said thermoset, high density polyurethane foam comprising said laminating layer has a higher density than said thermoset, low density polyurethane foam comprising said intermediate layer.

62. The process of claim 61 wherein said thermoset, high density polyurethane foam comprising said bottom layer has a higher density than said thermoset, low density polyurethane foam comprising said intermediate layer.

* * * * *